United States Patent [19]

Arita

[11] 4,344,170
[45] Aug. 10, 1982

[54] TIME DIVISION SWITCHING CIRCUIT WITH TIME SLOT INTERCHANGE

[75] Inventor: Takemi Arita, Inagi, Japan

[73] Assignee: Nippon Telegraph & Telephone Public Corporation, Tokyo, Japan

[21] Appl. No.: 80,679

[22] Filed: Oct. 1, 1979

[30] Foreign Application Priority Data

Oct. 19, 1978 [JP] Japan .................................. 53-128710

[51] Int. Cl.³ .............................................. H04Q 11/04
[52] U.S. Cl. ........................................ 370/68; 370/59; 370/63; 370/64; 370/66
[58] Field of Search ....................... 370/68, 59, 63, 64, 370/66

[56] References Cited

U.S. PATENT DOCUMENTS

| | | | |
|---|---|---|---|
| 3,217,106 | 11/1965 | Muroga | 370/68 |
| 3,236,951 | 2/1966 | Yamamoto | 370/68 |
| 3,706,853 | 12/1972 | Saito | 370/68 |
| 3,812,294 | 5/1974 | Pederson | 370/68 |
| 4,154,986 | 5/1979 | Howells | 370/68 |

*Primary Examiner*—David L. Stewart
*Attorney, Agent, or Firm*—Frishauf, Holtz, Goodman and Woodward

[57] ABSTRACT

A time division switching circuit with time slot interchange uses an input shift register to convert one-frame binary coded input data of time division multiplex type from an incoming line into a parallel bit output. The parallel bit output undergoes gate control of a gate matrix and its bit array is statically changed to a given bit array. The on/off control of the gate at the cross point of the gate matrix is conducted according to parallel bit outputs of a plurality of control shift registers which stores predetermined contents. The one-frame bit data thus exchanged are supplied to an output shift register. They are transmitted to an outgoing line as binary coded output data of time division multiplex type.

4 Claims, 1 Drawing Figure

TIME DIVISION SWITCHING CIRCUIT WITH TIME SLOT INTERCHANGE

BACKGROUND OF THE INVENTION

This invention relates to a time division switching circuit with time slot interchange which changes the bit array of time division multiplex data from an incoming line to the other bit array, and which transmits the data thus changed to an outgoing line.

A known time division switching circuit comprises, among other things, a data buffer memory capable of random access, a time slot counter and an address control memory capable of random access or cyclic access. One-frame data consisting of a predetermined number of time slots are supplied from an incoming line and written into the data buffer memory in a specific order, using the outputs of the time slot counter as write-in addresses. The data are read out from the data buffer memory in a random order, using the outputs of the address control memory as read-out addresses, and then are transmitted to an outgoing line. This is how the time division switching operation is achieved in the known time division switching circuit. Such a time division switching circuit is disclosed in, for example, U.S. Pat. No. 3,956,593.

The data buffer memory of the known circuit is usually a random access memory (RAM). Thus, every time a new time division switching equipment is designed, it is necessary to select memory elements which operate at a proper required speed for the switching ability of the equipment, and to design a special peripheral circuit which operates at a proper timing for the selected memory elements. The known time division switching circuit is designed for a special purpose and cannot therefore be used for various purposes. If the time division switching circuit is constituted by a single LSI, which seems possible owing to the rapid progress of IC technology, it cannot be manufactured in large quantities because it fails to serve various purposes. For this economical reason, it is difficult to manufacture the circuit of this type in the form of an LSI.

Moreover, the address control memory must be provided with as many signal lines as can designate a number of time slots included in one frame, said signal lines being used for writing data into the address control memory from a switch controller. Further there must be provided signal lines for supplying various clock signals to operate the data buffer memory and the address control memory, such as chip select signals and write-enable signals or signals for latching memory outputs at various resisters. Thus, if the time division switching circuit is made of a single LSI, pins must be used in greater numbers. This will also bring up the cost of the circuit.

It is an object of this invention to provide a time division switching circuit with time slot interchange which can easily be realized in an LSI, and which can serve various purposes.

SUMMARY OF THE INVENTION

According to this invention, there is provided a time division switching circuit with time slot interchange comprising an input shift register for converting one-frame binary coded input data of time division multiplex type from an incoming line into a parallel bit output; a gate matrix having cross points connected to bit output lines of the input shift register; a plurality of control shift registers connected to gates corresponding to the bits constituting said parallel bit output, and having predetermined contents for achieving on/off control of the respective gates; and an output shift register for simultaneously receiving the one-frame parallel bit output, the bit array of which have been statically changed from the input data by the on/off control of the prescribed gates of the gate matrix, and for transmitting the output to an outgoing line as binary coded output data of time division multiplex type.

The gate matrix instantaneously changes the bit array of one-frame binary coded data to a given bit array. The operation speed of the time division switching circuit of the present invention can therefore be freely determined by the shifting speed of the input and output shift registers and the control shift registers, i.e. the speed at which clock signals are supplied to these registers. The speed can be selected to be, for example, about 100 M (b/s) at most. For this reason, the time division switching circuit can be used for various purposes. The parallel bit output lines of the input shift register are connected to the corresponding input lines of the gate matrix, and the control data held in the control registers are supplied directly to the gates on the cross points of the gate matrix thereby to control the opening and closing of the gates. The circuit pattern is thus relatively simple, and the circuit can be easily realized in an LSI.

Further, only one signal line is adequate for writing data from a switch controller into the control shift registers, unlike in the known time division switching circuit in which a plurality of signal lines must be connected to the address control memory. Thus, the circuit according to this invention requires far fewer signal lines. If the circuit is made into an LSI wherein the gate matrix has 512×512 cross points and 512 control registers of 512 bits are used, the LSI has only 15 pins. Apparently, the LSI requires far fewer pins than the known time division switching circuit in the form of an LSI, and its cost is much lower.

DETAILED DESCRIPTION

Figure 1:
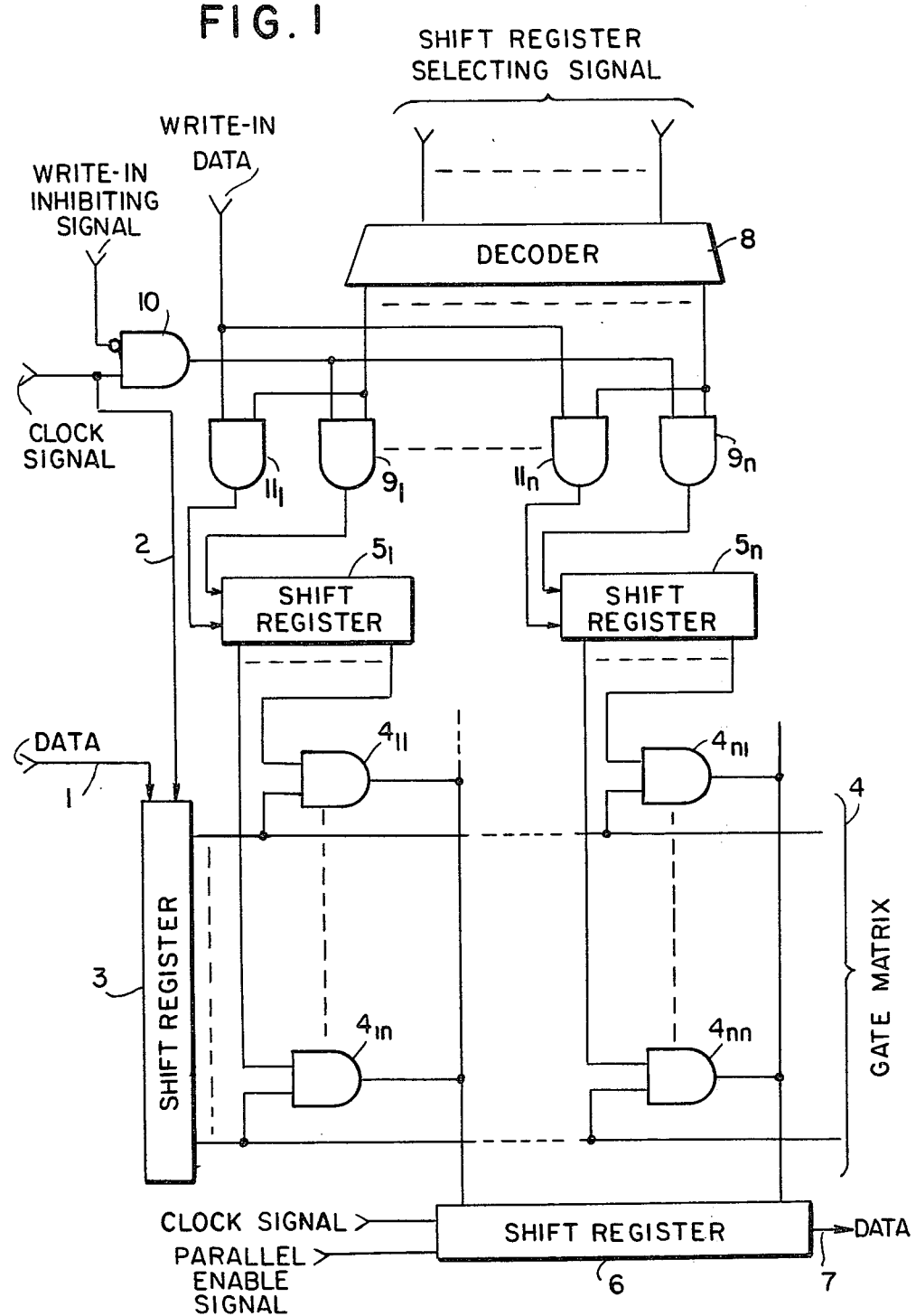
FIG. 1 is a block circuit diagram of an embodiment of this invention.

As shown in FIG. 1, a binary coded serial input data of time division multiplex type is supplied from an incoming line 1. Clock signals are supplied via a line 2 to an input shift register 3.

As shown in FIG. 1, output lines of the shift register 3, which come respectively from n bits, are the row lines of a gate matrix 4. Each column line of the gate matrix 4 is an input line of each bit of an output shift register 6. Each two-input NAND gate ($4_{ij}$, where $1<i,j<n$) is located at a respective cross point of the gate matrix 4. One input of each NAND gate $4_{ij}$ is connected to the output of a j-th bit of a control shift register $5_i$, and the other input to a row line of j-th bit of the shift register 3 ($1<i,j<n$). A one-frame binary coded input data is stored into the input shift register 3, bit by bit in synchronism with the clock signals. The one-frame data consists of T bits, which are stored in the input shift register 3 at corresponding bit locations, i.e. time slots. The input shift register 3 produces a parallel bit output, which is supplied to the gate matrix 4 constituted by gates arranged in rows and colums. The bits of the parallel bit output are supplied to gates $4_{11}$ to $4_{1n}$, gates $4_{21}$ to $4_{2n}$, ... and gates $4_{n1}$ to $4_{nn}$, the gates of each group forming a column. A plurality of control shift registers 5 are provided for the columns of gates, respectively. Each control shift register 5 achieves the on/off control of the gates of the corresponding column. More specifically, each control shift register 5 holds a specific binary coded data which opens or closes the gates constituting the column. The bits of the one-frame parallel bit output of the input shift register 3 are supplied through the gates opened by the outputs of the control shift registers 5, whereby its bit array is statically changed to another new bit array. The one-frame parallel bit data whose bit array has been thus exchanged is delivered from the gate matrix 4. The bits of the one-frame data are instantaneously stored into the output shift register 6 at the same time when a parallel enabling signal is supplied to the output shift register 6. The one-frame bit data, whose bit array or time slot positions have been exchanged, is transmitted serially, one bit after another, to an outgoing line 7.

As long as the gate matrix 4 exchanges bit arrays in a pattern according to the contents of the control shift registers 5, it is unnecessary to replace the contents of the shift registers 5 with new ones. If the bit arrays are to be exchanged in a different pattern, the binary coded data held in some of the control shift registers 5 have to be replaced with new ones. In this case, shift register selecting signals are supplied to a decoder 8. The decoder 8 produces an output, which is supplied through one of AND gates $9_1$ to $9_n$ to select a control shift register 5; whose contents should be replaced. If an output of the decoder 8 is supplied through the AND gate $9_1$ thereby to select the control shift register $5_l$, a clock signal is supplied to the AND gate $9_1$ through an inhibit gate 10. This clock signal function as a write-in clock signal to the selected shift register $5_1$. If a new binary coded data is supplied to an AND gate $11_1$ the moment the write-in clock signal is supplied to the AND gate $9_1$, the AND gate $11_1$ is opened, whereby the new binary coded data is written into the control shift register $5_1$. The write-in clock signal is supplied to the selected shift register $5_1$ at the same time a clock signal is supplied to the input shift register 3 through the line 2. Thus, the contents of a selected shift register 5; are replaced while a one-frame bit data is stored into the input shift register 3. Such data replacement can be conducted 400 times a second if it takes 2.5 ms to store a one-frame bit data into the input shift register 3.

Generally, to accomplish one pair of switched connections, two data paths are necessary, an upward path and a downward path. Thus, two shift registers must have their contents replaced. In case the data replacement is effected 400 times a second, 200 calls can be connected in a second. Usually tens of calls occur per second in a large-scale data switch which has as many as ten thousand terminal devices. In view of this the time division switching circuit, wherein data replacement can be made 400 times a second, is fully practicable.

If the data stored in the control shift registers 5 need not be replaced, a write inhibit signal is supplied to the inhibit gate 10 thereby to prevent supply of clock signals to all the control shift registers 5.

Figure 2:
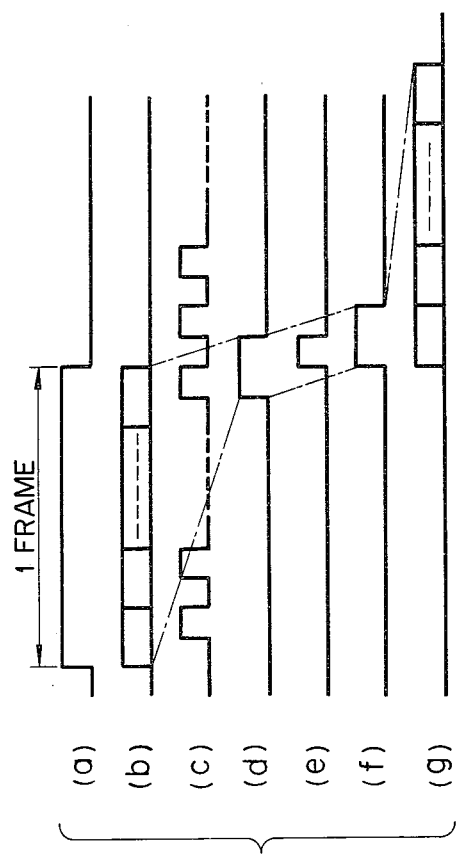
FIGS. 2(a) to 2(g) are a time chart illustrating how the embodiment of FIG. 1 operates.

FIGS. 2(a) to 2(g) are a time chart of the signals at the various parts of the circuit of FIG. 1. Suppose the output of the decoder 8 continues to a period of time corresponding to the length of a one-frame data as illustrated in FIG. 2(a). Then, during the one-frame period an input data shown in FIG. 2(b) which consists of T bits (i.e. T time slots) is stored into the input shift register 3, bit by bit, each bit being shifted in synchronism with the leading edge of a clock signal shown in FIG. 2(c). When a one-frame data is stored into the input shift register 3 as shown in FIG. 2(d), a parallel enabling signal is supplied to the output shift register 6 as shown in FIG. 2(e). The one-frame data which has been changed to a bit array by the gate matrix 4 is then instantaneously supplied in parallel to the output shift register 6 as shown in FIG. 2(f). The data is transmitted from the output shift register 6 as a series binary coded data of time division multiplex type as illustrated in FIG. 2(g).

In the above-described embodiment the time period of one bit (time slot) is much longer than the sum of the time delay in data propagation in the gate matrix 4 and the time required to store a one-frame data into the output shift register 6. In case the duration of the time slots is nearly equal to the sum of the delay time and the time for data storing, the duration of the last time slot of each one-frame may be allotted to the delay in data propagation and the time for data storing.

In the circuit of FIG. 1 the control shift registers $5_1$ to $5_n$ are so arranged as to correspond to a column of the gate matrix 4. Instead they may be arranged to correspond to the respective rows of the matrix 4. In this case, a time slot data received from the input shift register 3 can be supplied as a plurality of the same time slot data to the output shift register 6, whereby the so-called multi-drop service in data communication is easily achieved by transmitting the same information to many terminal devices at the same time.

Figure 3:
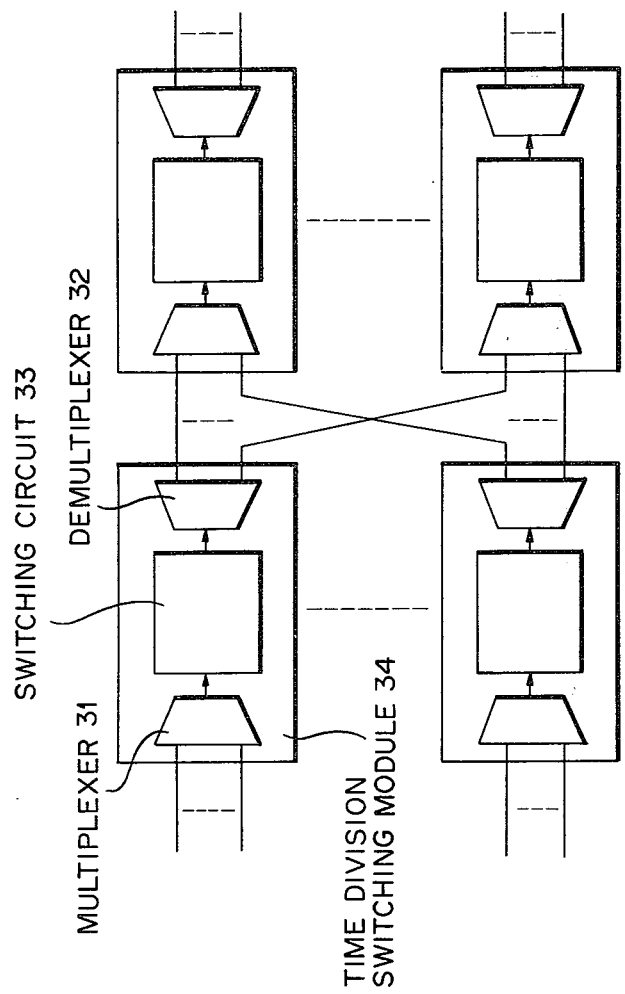
FIG. 3 is a block circuit diagram showing another embodiment of a larger scale than the embodiment of FIG. 1.

If the large-scale integration technology is inadequate and the circuit of FIG. 1 fails to make a switching circuit of a desired scale, a multiplexer 31 and a demultiplexer 32 may be connected to the switching circuit 33 thereby to constitute a time division switching module 34, as shown in FIG. 3. Further a plurality of such switching modules 34 are connected as illustrated also in FIG. 3, thereby to provide a switching circuit of the desired scale.

What is claimed is:

1. A time division switching circuit with time slot interchange comprising:
    an input shift register for converting one-frame binary coded data of time division multiplex type from an incoming line into a parallel bit output;
    a gate matrix having cross points connected to bit output lines of said input shift register;
    a plurality of control shift registers connected to the gates of said gate matrix such that each control shift register corresponds to a respective bit of an output frame, and having predetermined contents for achieving on/off control of the respective gates; and
    an output shift register coupled to said gate matrix for simultaneously receiving parallel bit outputs from said gate matrix, the bit array of which have been statically changed from the input data by said gate matrix, and for transmitting the parallel bit output data thus exchanged to an outgoing line as binary coded output data of time division multiplex type.

2. The time division switching circuit of claim 1, wherein the gates of said gate matrix located at said cross points form columns of said matrix.

3. The time division switching circuit of claim 2, wherein said control shift registers each comprise a plurality of bits, one bit of each control shift register being connected to one cross point of a respective column of said gate matrix.

4. The time division switching circuit of any one of claim 1-3, further comprising a multiplexer coupled between said incoming line and said input shift register; and a demultiplexer coupled between said output shift register and said outgoing line.

* * * * *